No. 816,722. PATENTED APR. 3, 1906.
W. H. FROGGATT, Jr.
PUNCH HOLDER.
APPLICATION FILED DEC. 12, 1905.
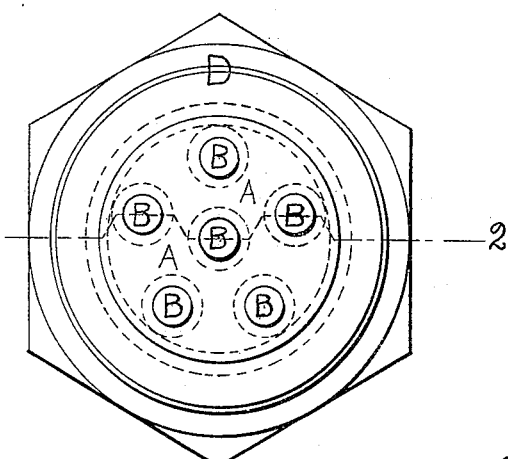
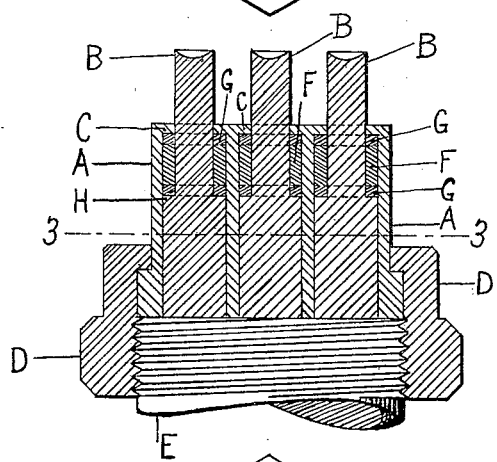
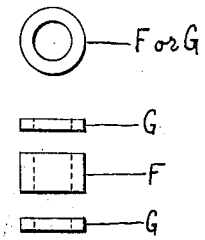
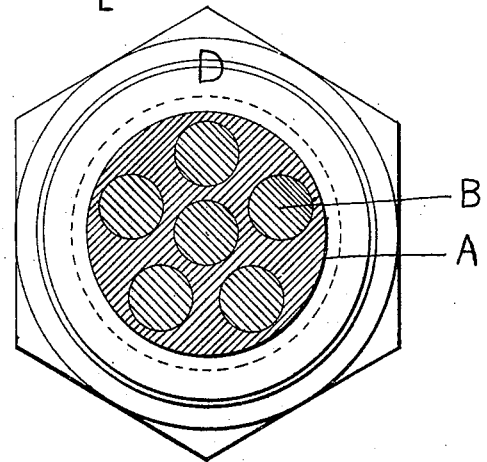
Witness Thomas H. Nelson
W. W. Menzinger Jr.
Inventor
William H. Froggatt Jr.
by Henry John Nelson
Attorney

UNITED STATES PATENT OFFICE.

WILLIAM H. FROGGATT, JR., OF PHILADELPHIA, PENNSYLVANIA.

PUNCH-HOLDER.

No. 816,722.      Specification of Letters Patent.      Patented April 3, 1906.

Application filed December 12, 1905. Serial No. 291,383.

*To all whom it may concern:*

Be it known that I, WILLIAM H. FROGGATT, Jr., a citizen of the United States, residing at Philadelphia, in the county of Philadelphia and State of Pennsylvania, have invented certain new and useful Improvements in Punch-Holders, of which the following is a specification.

My invention relates to single and multiple punch-holders within which fiber, rubber, or composition washers or spiral springs hold one punch or more firmly against the plunger.

The objects of my invention are, first, to make a punch-holder which by the use of fiber, rubber, or composition washers or spiral springs will only necessitate making the punches accurately as to their total length and diameters and not as to the distances between shoulders, as is now necessary with other punch-holders; second, to make punch-holders capable of using punches which may be made more quickly than those now in use; third, to make punch-holders capable of using punches which may be made more cheaply than those now in use; fourth, to make punch-holders adapted to any use for which punch-holders are now used and especially adapted to the manufacture of medicinal tablets. I attain these objects by the machine illustrated in the accompanying drawings, in which—

Figure 1 is the top view of the entire machine; Fig. 2, a vertical section of the entire machine on the line 2 2, Fig. 1; Fig. 3, a top view of the entire machine on the line 3 3, Fig. 2; Fig. 4, a top view of a part of the machine, being the fiber, rubber, or composition washers or spiral springs; Fig. 5, a side view of a part of the machine, being the fiber, rubber, or composition washers or spiral springs.

Similar letters refer to similar parts throughout the several views.

The punch-holder proper, A, is bored for, say, six punches B, B, B, B, B, and B. The punches B, B, B, B, B, and B have one shoulder H inside the punch-holder proper, A, and may or may not have a shoulder where the punches extend beyond the holder A, depending on the diameters of the punches required. The punch-holes in the punch-holder proper, A, are bored with one diameter except for a small shoulder C, where the punches extend beyond the holder A. Sufficient space is left between the shoulders H of the punches and the shoulders C of the holder A to insert fiber, rubber, or composition washers or spiral springs F and G.

The washers or springs F and G are cemented together and cemented or otherwise fastened to the shoulders C of the holder A, so as to keep them in place when the punches B are removed. The thickness of the washers or springs F and G is greater than the distances from the shoulders H of the punches B to the shoulders C of the holder A. This excess of thickness of the washers or springs F and G on account of the compressibility of the washers or springs F and G will enable the holder A to be screwed on the plunger E by means of the nut D and to be tightened up, so as to hold one punch B or more firmly against the plunger E, though the heights of the punch-shoulders H may vary if there is more than one punch B.

I prefer that washers F and G should be used in the punch-holder in preference to the spiral springs.

I claim—

A punch-holder consisting of a round metal blank with holes drilled through it, leaving shoulders to keep the punches from falling out, and compressible composition washers cemented to the shoulders of the holes, on the inside of the holes, so as to form a continuation of, and of the same width as, the shoulders of the holes.

In testimony whereof I affix my signature in presence of two witnesses.

WILLIAM H. FROGGATT, JR.

Witnesses:
   WILLIAM H. FROGGATT, Sr.,
   H. H. SINNAMON.